(12) United States Patent
Toyama et al.

(10) Patent No.: US 9,536,641 B2
(45) Date of Patent: Jan. 3, 2017

(54) METHOD OF MANUFACTURING AN AUTOMOBILE HIGH VOLTAGE WIRE HARNESS

(75) Inventors: Eiichi Toyama, Kosai (JP); Takashi Kato, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 293 days.

(21) Appl. No.: 14/233,402

(22) PCT Filed: Jul. 20, 2012

(86) PCT No.: PCT/JP2012/068503
§ 371 (c)(1),
(2), (4) Date: Jan. 17, 2014

(87) PCT Pub. No.: WO2013/012077
PCT Pub. Date: Jan. 24, 2013

(65) Prior Publication Data
US 2014/0165392 A1    Jun. 19, 2014

(30) Foreign Application Priority Data
Jul. 21, 2011    (JP) .................................. 2011-159515

(51) Int. Cl.
*H01B 13/012*    (2006.01)
*B60R 16/02*    (2006.01)

(52) U.S. Cl.
CPC ......... *H01B 13/012* (2013.01); *B60R 16/0215* (2013.01); *Y10T 29/49117* (2015.01)

(58) Field of Classification Search
CPC ..... H01B 7/0045; H01B 7/0258; H01B 13/00; H01B 13/004; H01B 13/012; B60R 16/0215; Y10T 29/49117
See application file for complete search history.

(56) References Cited

U.S. PATENT DOCUMENTS

| 5,744,206 A | 4/1998 | Russek et al. |
| 6,068,935 A | 5/2000 | Hayami et al. |
| 7,255,602 B1 | 8/2007 | Driessen et al. |

(Continued)

FOREIGN PATENT DOCUMENTS

| CN | 101258790 A | 9/2008 |
| CN | 201323414 Y | 10/2009 |

(Continued)

OTHER PUBLICATIONS

Japanese Office Action issued in Japanese Patent Application No. 2012-160647 on Feb. 23, 2016.

(Continued)

*Primary Examiner* — Carl Arbes
(74) *Attorney, Agent, or Firm* — Morgan, Lewis & Bockius LLP

(57) ABSTRACT

A method of manufacturing an automobile high voltage wire harness includes setting a shrinkable tube which has a color to make the wire harness recognized as a high voltage one outside a metal pipe body which is an exterior member of one or a plurality of high voltage electrical pathway(s) wired in an automobile, making the shrinkable tube shrink to cover part of or all of the outer surface of the metal pipe body, and bending the metal pipe body to a predetermined position to be formed into a three-dimensional shape.

3 Claims, 3 Drawing Sheets

(56) References Cited

U.S. PATENT DOCUMENTS

| | | |
|---|---|---|
| 2005/0011687 A1 | 1/2005 | Yamaguchi et al. |
| 2009/0107694 A1 | 4/2009 | Watanabe |
| 2010/0319956 A1 | 12/2010 | Ballard et al. |
| 2013/0284487 A1 | 10/2013 | Izawa et al. |

FOREIGN PATENT DOCUMENTS

| | | | |
|---|---|---|---|
| JP | 6-32875 U | | 4/1994 |
| JP | 2000-95846 A | | 4/2000 |
| JP | 2002-039449 A | | 6/2002 |
| JP | 2004-224156 A | | 8/2004 |
| JP | 2009140612 A | * | 6/2009 |
| JP | 2009143326 A | * | 7/2009 |
| JP | 2011-109865 A | | 6/2011 |
| JP | 2012-178942 A | | 9/2012 |
| WO | 2007-029801 A1 | | 3/2007 |

OTHER PUBLICATIONS

Written Opinion of the International Searching Authority dated Aug. 28, 2012 for International application No. PCT/JP2012/068503.
Extended European Search Report dated Feb. 25, 2015, for corresponding European Application No. 12815446.5.
Office Action issued in corresponding Chinese Patent Application No. 201280036191.6 dated Oct. 26, 2015.
International Search Report dated Aug. 28, 2012 for International application No. PCT/JP2012/068503.

* cited by examiner

METHOD OF MANUFACTURING AN AUTOMOBILE HIGH VOLTAGE WIRE HARNESS

TECHNICAL FIELD

The present invention relates to an automobile high voltage wire harness and a method of manufacturing the automobile high voltage wire harness.

BACKGROUND ART

A wire harness disclosed in the following PTL1 includes three high voltage electric wires, and three metal protecting pipes for accommodating and protecting the three high voltage electric wires respectively. The high voltage electric wires are included to connect a motor that is carried in the front of an automobile and an inverter which is carried in the middle of the automobile or at the back side of the automobile.

The wire harness is adapted to be wired along and under an automobile body floor which is at the outside of an automobile body frame. Therefore, the metal protecting pipes are formed so that the high voltage electric wires can be protected from a stone splash and a water splash. The metal protecting pipes protect the high voltage electric wires from a stone splash and a water splash, have rigidity to prevent the high voltage electric wires from being bended, and have an electromagnetic shielding function because the metal protecting pipes are made of metal.

The wire harness is manufactured by inserting the high voltage electric wires into the metal protecting pipes which are in a straight state, and, after the insertion has been performed respectively, bending the metal protecting pipes along the wiring path of the wire harness under the automobile body floor. After the wire harness is manufactured as above in the factory of a harness manufacturer, the wire harness is conveyed to an assembly plant of the automobile manufacturer and is assembled to a predetermined position of an automobile, and thereby the wiring is completed.

CITATION LIST

Patent Literature

PTL1: JP-A-2004-224156

SUMMARY OF THE INVENTION

Technical Problems

For a wire harness which includes high voltage electric wires, it is necessary to color the exterior member orange as a means to recognize that the wire harness is a high voltage one.

For example, the outer surface of a metal exterior member (a pipe body) such as a metal protecting pipe disclosed in PTL1 is painted orange to make the wire harness recognized as a high voltage one.

The inventor of the present invention considers using a metal pipe body, for example, made of aluminum to protect the high voltage electric wire. In this case, there are the following problems.

That is, to paint the outer surface of the aluminum metal pipe body orange, it is necessary to first clean the surface (the outer surface), then perform surface treatment, then undercoat and topcoat, and finally perform heat treatment. Thus, there are problems that the processing steps become long and the cost is increased.

Further, since organic solvents may be used as painting materials, there are problems that an extensive VOC measure is necessary and the expense is increased. The above VOC (Volatile Organic Compounds) is the abbreviation of volatile organic compounds, and solvent is cited as a specific example. When the VOC is released to the environment, it is generally known that pollution or the like may be caused.

It is important that all the processing steps are performed. For example, if the surface treatment or the undercoating is omitted and only the topcoating is performed, the coherency of the topcoating to the aluminum surface becomes worse, and there are problems which influence the quality such as that coating dimples may be partially produced or the coating film becomes not uniform. It is needless to say that the management of the coating film is difficult.

In addition, for example, if the surface treatment or the undercoating is omitted, there is a problem that the coating may be stripped when the metal pipe body is bended.

If a clamp, for example, is used to fix the metal pipe body to a predetermined position, because the management of the coating film is difficult which has an impact on the shape design of the clamp, there is a problem that the cost is increased.

The present invention is made in view of the above situations, and the object of the present invention is to provide an automobile high voltage wire harness and a method of manufacturing the automobile high voltage wire harness so that it is possible to simplify the processing steps to make the wire harness recognized as a high voltage one.

Solution to Problem (1) According an aspect of the invention to solve the above disadvantage, an automobile high voltage wire harness includes one or a plurality of high voltage electrical pathway that is wired in an automobile, a metal pipe body that is an exterior member of the high voltage electrical pathway, and a shrinkable tube that covers part of or all of an outer surface of the metal pipe body and has a color to make the wire harness recognized as a high voltage one.

According to the present invention having the above configuration (1), to make the wire harness recognized as a high voltage one, part of or all of the outer surface of the metal pipe body is covered by a shrinkable tube. The shrinkable tube is colored with a color with which the wire harness can be recognized as a high voltage one, and particularly which is orange that is specified currently. It is easier to manage the thickness by using the shrinkable tube than, for example, by coating. Since the dimension precision of the thickness of the shrinkable tube is higher than that of the coating, the shape design of the clamp which is used to fix the metal pipe body becomes very easy. If components are assembled onto the metal pipe body, it is very easy to set the allowance. Furthermore, because it is not necessary to manage the coating when the shrinkable tube is used, the general management becomes very easy. In addition, the processing steps and devices are simplified by using the shrinkable tube in comparison with, for example, the painting. Since the shrinkable tube is used, the coating will not be stripped when the metal pipe body is bended. Furthermore, since the shrinkable tube is used, the coherency to the metal pipe body is improved, there will be no coating dimples or coating spots, and the appearance is well ensured.

(2) In the automobile high voltage wire harness of (1), the shrinkable tube is returned to cover an outer surface at an end portion of the metal pipe body, an end surface of the metal pipe body, and an inner surface at the end portion of the metal pipe body.

According to the present invention having the above configuration (2), the shrinkable tube covers from the outer surface of the metal pipe body to the inner surface of the metal pipe body. Thereby, a end part process, in other words, a beforehand edge process at the metal pipe body side is not necessary. According to the present invention, it is possible that separate components which are used in the edge process of the metal pipe body are not necessary.

(3) In the automobile high voltage wire harness of (1), the shrinkable tube covers an end portion of the metal pipe body and a pipe body drawn out part of the high voltage electrical pathway(s) which is drawn out from the end portion of the metal pipe body.

According to the present invention having the above configuration (3), the end portion of the metal pipe body and a pipe body drawn out part of the high voltage electrical pathway which is drawn out from the end portion of the metal pipe body are covered by the shrinkable tube. Thereby, the process of the pipe body drawn out part, for example, the fixation by tape winding, the sealing process, the waterproofing process or the like is not necessary. According to the present invention, it is possible that a tape, or a sealing material, or a waterproofing material which is used in the process of the pipe body drawn out part is not necessary.

(4) The automobile high voltage wire harness of (1) further includes a corrugated tube that is connected to the end portion of the metal pipe body, and the shrinkable tube covers the end portion and a pipe body connecting part of the corrugated tube which is connected to the end portion.

According to the present invention having the above configuration (4), the end portion of the metal pipe body and a pipe body connecting part of a corrugated tube are covered by the shrinkable tube. Thereby, the process of the pipe body connecting part, for example, the fixation by tape winding or the fixation by other members is not necessary. According to the present invention, a tape or a fixing member to connect the metal pipe body and the corrugated tube is not necessary. Even if a fixing member is to be temporarily used, it is possible to use a simple fixing member.

(5) According to an another aspect of the invention to solve the above disadvantage, a method of manufacturing an automobile high voltage wire harness includes a first step of setting a shrinkable tube which has a color to make the wire harness recognized as a high voltage one outside a metal pipe body which is an exterior member of one or a plurality of high voltage electrical pathway(s) wired in an automobile, a second step of making the shrinkable tube shrink to cover part of or all of the outer surface of the metal pipe body, and a third step of bending the metal pipe body to a predetermined position to be formed into a three-dimensional shape.

According to the present invention having the above configuration (5), only by setting the shrinkable tube and making the shrinkable tube shrink, the metal pipe body which can make the wire harness recognized as a high voltage one has been manufactured. By bending the metal pipe body, a three-dimensional wire harness has been manufactured.

Effects of the Invention

According to the present invention, effects are achieved which are that to make the wire harness recognized as a high voltage one, the processing steps can be simplified, the cost can be reduced, and the quality can be improved.

According to the present invention, since the edge process at the metal pipe body side can be simplified, an effect is achieved which is that the cost can be reduced.

According to the present invention, since the process of the pipe body drawn out part can be simplified, an effect is achieved which is that the cost can be reduced.

According to the present invention, since the process of making the metal pipe body and the corrugated tube connected can be simplified, an effect is achieved which is that the cost can be reduced.

According to the present invention, an effect is achieved which is that a method of manufacturing an automobile high voltage wire harness for which the processing steps to make the wire harness recognized as a high voltage one may be simplified, the cost may be reduced, and the quality may be improved can be provided.

BRIEF DESCRIPTION OF DRAWINGS

FIGS. 1A and 1B are figures of an automobile high voltage wire harness of the present invention, in which FIG. 1A is a schematic view which shows the automobile high voltage wire harness is wired and FIG. 1B is a structure view of the automobile high voltage wire harness (an embodiment 1).

DESCRIPTION OF EMBODIMENTS

A wire harness includes one or a plurality of high voltage electrical pathway(s) and a metal pipe body which is an exterior member of the high voltage electrical pathway(s), which are wired in an automobile. To be recognized as a high voltage one, the wire harness further includes a shrinkable tube which covers part of or all of the outer surface of the metal pipe body. The shrinkable tube is colored with a color with which the wire harness can be recognized as a high voltage one, and particularly which is orange that is specified currently.

Embodiment 1

Figure 1A:
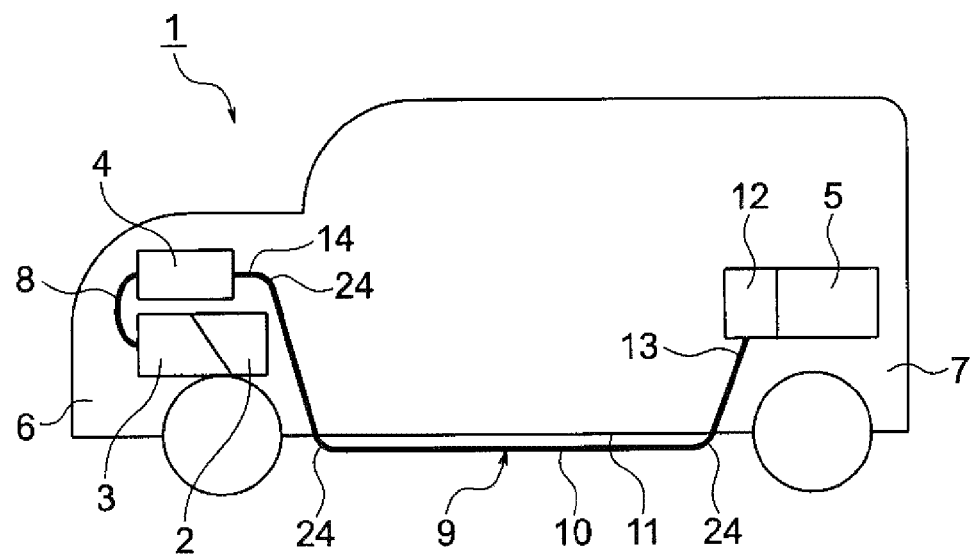
Figure 1B:
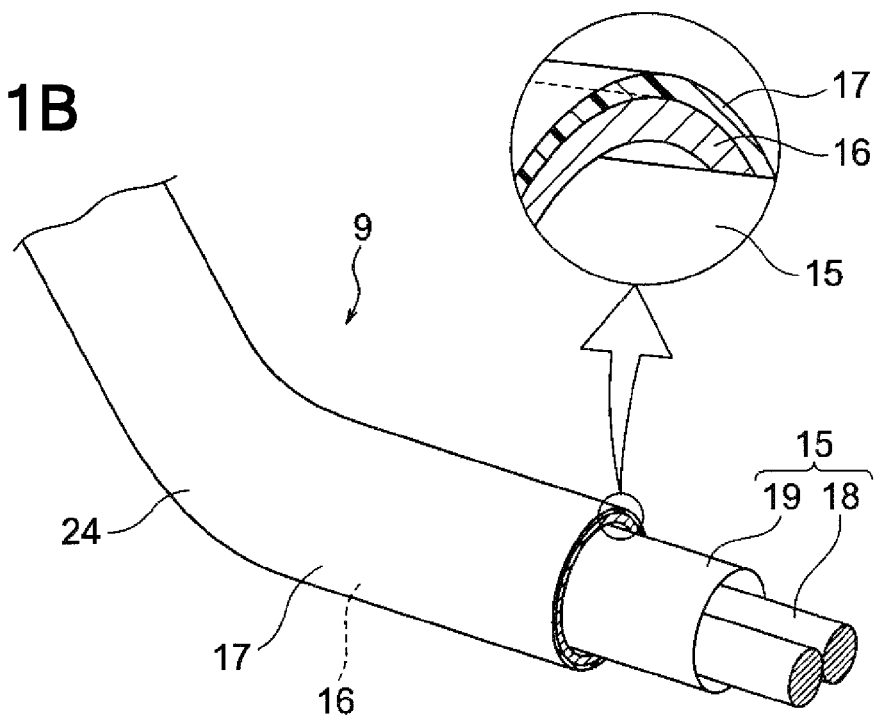

Next, an embodiment 1 is described with reference to the figures. FIGS. 1A and 1B are figures related to an automobile high voltage wire harness of the present invention. FIGS. 2A to 2E are figures related to a method of manufacturing the automobile high voltage wire harness.

In the present embodiment, an example in which a wire harness of the present invention is applied to a hybrid automobile (it may be an electric automobile or an ordinary automobile) is given and described.

In FIG. 1A, a reference number 1 indicates a hybrid automobile. The hybrid automobile 1 is an automobile which is driven by mixing two powers of an engine 2 and a motor unit 3. The electric power from a battery 5 (battery pack) is supplied to the motor unit 3 via an inverter unit 4. The engine 2, the motor unit 3 and the inverter unit 4 are carried in an engine room 6 at the position of the front wheels and the like in the embodiment. The battery 5 is carried in an automobile back part 7 of the back wheels and the like. The battery 5 may be carried in an automobile indoor space behind the engine room 6.

Although the motor unit 3 and the inverter unit 4 are connected by a well-known high voltage wire harness 8, a high voltage wire harness 9 according to the present invention may be used. The battery 5 and the inverter unit 4 are connected by the high voltage wire harness 9 (automobile high voltage wire harness) according to the present invention. The wire harness 9 is constructed as a high voltage one. A middle part 10 of the wire harness 9 is wired at the ground side of an automobile body floor 11. The middle part 10 is wired along the automobile body floor 11. The automobile body floor 11 is a well-known body and is a so-called panel member, and is formed with through holes (whose reference numbers are omitted) at predetermined positions. The wire harness 9 is inserted through the through holes.

The wire harness 9 and the battery 5 are connected through a junction block 12 which the battery 5 is provided with. A back end 13 of the wire harness 9 is connected to the junction block 12 with a connector. The side of the wire harness 9 at the back end 13 is wired above the floor at the indoor side of the automobile. The side of the wire harness 9 at a front end 14 is also wired above the floor. The side of the wire harness 9 at the front end 14 is connected to the inverter unit 4 with a connector.

The present embodiment is further described as follows. In the motor unit 3, a motor and a generator are accommodated. From the junction block 12 which the battery (battery pack) 5 at the back side of the automobile is provided with, and through the wire harness 9 according to the present invention and the inverter unit 4 at the front side of the automobile, electric power is supplied to the motor in the motor unit 3. In addition, the inverter unit 4 accommodates an inverter which converts direct current into alternate current and a converter which converts alternate current into direct current. The motor unit 3 is formed as a motor assembly including a shielding case. The inverter unit 4 is also formed as an inverter assembly including a shielding case. The battery 5 is a Ni-MH battery or Li-ion battery, and is modulated. For example, an electric power storage device such as a capacitor may be used. The battery 5 shall not be particularly limited as long as the battery 5 may be used for the hybrid automobile 1 or an electric automobile.

Next, the composition and structure of the wire harness 9 are described.

The wire harness 9 includes an electrical pathway aggregate 15, a metal pipe body 16 which is an exterior member of the electrical pathway aggregate 15 and a shrinkable tube 17 which covers the metal pipe body 16.

The electrical pathway aggregate 15, as shown in FIG. 1B, includes two high voltage electric wires 18 and an electromagnetic shielding member 19 which collectively shields the two high voltage electric wires 18. The electrical pathway aggregate 15 may further include a low voltage electric wire. The high voltage electric wire 18 is a high voltage electrical pathway including a conductor and an insulator (coating), and is formed to have a length that is necessary for electrical connection. The conductor is made of copper, copper alloy or aluminum. The conductor may have either a conductor structure in which wires are twisted or a rod-like conductor structure whose cross section is a rectangular shape or a round shape. If the conductor has a rod-like conductor structure whose section is a rectangular or circular shape, the conductor has, for example, a conductor structure of a single rectangular core or a single round core. The high voltage electric wire 18 includes a conductor and an insulator as described above, or has a non-shielded electric wire, that is, a structure which does not include a shielding conductor. A end portion of the high voltage electric wire 18 is provided with a connector (not shown in the figure).

The high voltage electric wires 18 are used in the present embodiment, but the invention shall not be limited to this. For example, it is also possible to provide a well-known bus bar with an insulator to be used as a high voltage electrical pathway.

The electromagnetic shielding member 19 is an electromagnetic shielding member which covers the two high voltage electric wires 18 (a shielding member as a measure to prevent electromagnetic wave). The electromagnetic shielding member 19 is formed of a shielding member containing a conductive metal foil or a metal foil alone into a pipe-like shape. The electromagnetic shielding member 19 is formed to have about the same length as the full length of the two high voltage electric wires 18. The electromagnetic shielding member 19 is connected to the shielding case of the inverter unit 4 or the like directly or through a connector (not shown in the figure).

The electromagnetic shielding member 19 contains a metal foil in this embodiment, but the present invention is not limited to this. That is, as long as the electromagnetic wave can be dealt with, for example, a web which has a number of extra-fine strands may be used as the electromagnetic shielding member 19. The web has conductivity and is formed into a pipe-like shape.

The electromagnetic shielding member 19 includes the high voltage electric wire 18 which has a structure of the non-shielded electric wire as described above. When the well-known shielded electric wires are applied to the high voltage electric wires 18, the electromagnetic shielding member 19 is not required as a necessary component.

The metal pipe body 16 is a metal pipe-like pipe body and is formed to have a length necessary to accommodate the electrical pathway aggregate 15. The metal pipe body 16 is formed to have a circular cross section in the embodiment. The metal pipe body 16 may also have an oval, ellipse or rectangular cross section. The metal pipe body 16 is bended according to the wiring path.

In this embodiment, an aluminum pipe member is used as the metal pipe body 16. The material of the metal pipe body 16 is not particularly limited to aluminum, but may be any metal material.

Because the wire harness 9 includes the high voltage electric wires 18, it is necessary to recognize the wire harness 9 as a high voltage one. As means for this purpose, the wire harness 9 further includes the orange shrinkable tube 17 which covers the metal pipe body 16.

The shrinkable tube 17 is a pipe-like member which shrinks and adheres to the outer surface of the metal pipe body 16, and in this embodiment, a resin tube which shrinks by heat (a thermal shrinkable tube) is used. Even if the metal pipe body 16 is not painted orange like traditional ones, the shrinkable tube 17 can be a substitute for the painting. Because the shrinkable tube 17 is made by resin as described above, the shrinkable tube 17 is insulative.

The material of the shrinkable tube 17 may be vinyl chloride, PET, PBT or the like. In this embodiment, a thin vinyl chloride tube which is difficult to catch fire and has strong resistance to bending or the like is used.

The thickness of the shrinkable tube 17 is much smaller than that of the metal pipe body 16 so that the shrinkable tube 17 is easy to be adhered to the outer surface of the metal pipe body 16, and the shrinkable tube 17 has such a thickness that the influence of a stone splash or a water splash will not reach the metal pipe body 16.

It is preferable that the shrinkable tube 17 covers all the outer surface of the metal pipe body 16, but the present invention is not limited to this. That is, the metal pipe body 16 may be partially covered as long as the wire harness 9 can be recognized as a high voltage one.

Next, a method of manufacturing the wire harness 9 is described. In the wire harness 9, the part which includes the metal pipe body 16 and the shrinkable tube 17 is a characteristic part of the present invention. Therefore, steps of the method, particularly the manufacturing steps of producing the characteristic part, are sequentially described.

Figure 2A:
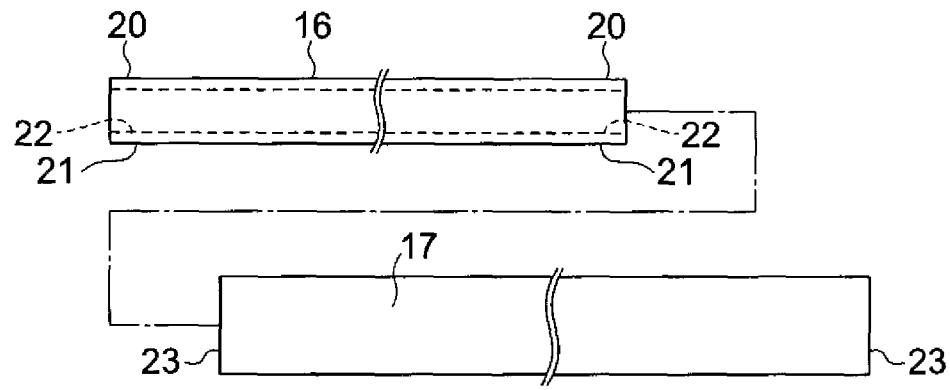
FIGS. 2A to 2E are figures related to a method of manufacturing the automobile high voltage wire harness.

In FIG. 2A, a step of preparing the straight metal pipe body 16, which has a circular cross section and a predetermined length, and the shrinkable tube 17 (the shrinkable tube 17 before shrinking), whose inner diameter is bigger than the outer diameter of the metal pipe body 16, is performed. A tube whose full length is larger than the full length of the metal pipe body 16 is used as the shrinkable tube 17 before shrinking. The shrinkable tube 17 before shrinking may have a smaller length than that described above when the shrinkable tube 17 partially covers the metal pipe body 16 or when the edge process to be described below is not performed.

For the metal pipe body 16, reference numbers 20 show the end portion of the metal pipe body 16. Reference numbers 21 show the outer surfaces at the end portion of the metal pipe body 16, and reference numbers 22 show the inner surfaces at the end portion of the metal pipe body 16.

Figure 2B:
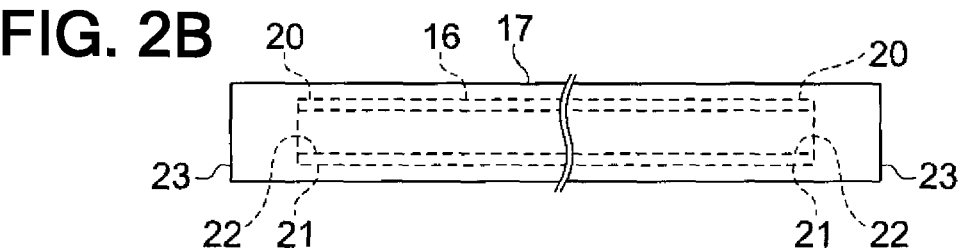

In FIG. 2B, a step of inserting the metal pipe body 16 into the shrinkable tube 17 before shrinking and setting the metal pipe body 16 and the shrinkable tube 17 at predetermined positions is performed. The end portions 20 of the metal pipe body 16 are positioned away from the end portions 23 of the shrinkable tube 17 before shrinking by a predetermined length. When the metal pipe body 16 and the shrinkable tube 17 are set, the metal pipe body 16 is loose in the shrinkable tube 17 before shrinking, that is, there is a space between the outer peripheral surface of the metal pipe body 16 and the inner peripheral surface of the shrinkable tube 17.

Figure 2C:
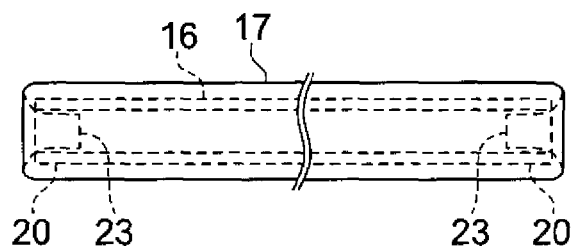

In FIG. 2C, a step of returning the end portions 23 of the shrinkable tube 17 before shrinking to the inside of the shrinkable tube 17, and further inserting the returned end portions 23 of the shrinkable tube 17 into the inside of the metal pipe body 16 is performed. The end portions 23 are returned and inserted in this step so that the edge process of the metal pipe body 16 is performed. Thus, since the end surface of the metal pipe body 16 is covered by the shrinkable tube 17, a beforehand edge process of the end portions 20 of the metal pipe body 16 may be not necessary.

The steps by far are equivalent to a first step of setting the shrinkable tube 17 of such a color that the wire harness can be recognized as a high voltage one outside the metal pipe body 16 which is an exterior member of one or a plurality of high voltage electrical pathway(s) wired in an automobile.

Figure 2D:
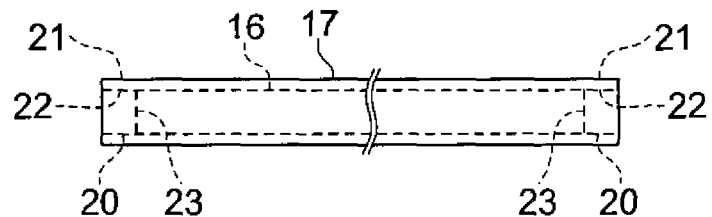

In FIG. 2D, a step of making the shrinkable tube 17 shrink and adhere to the metal pipe body 16 is performed. The shrinkable tube 17 shrinks by being heated at a predetermined temperature as a whole. The shrinkable tube 17, if made by vinyl chloride, shrinks enough simply by being heated at approximately 100 degree Celsius for several minutes. The shrinkable tube 17 covers all the outer surface of the metal pipe body 16, and the shrinkable tube 17 covers from the outer surface 21 of the pipe body 16 to the inner surface 22 of the pipe body 16. The edge process of the end portions 20 of the metal pipe body 16 is completed when the shrinkable tube 17 surrounds around the edge parts.

The steps by far are equivalent to a second step of making the shrinkable tube 17 shrink to cover part of or all of the outer surface of the metal pipe body 16. The step of inserting the electrical pathway aggregate 15 (refer to FIG. 1B) into the metal pipe body 16 is performed in the first step as described above, or after the second step.

Figure 2E:
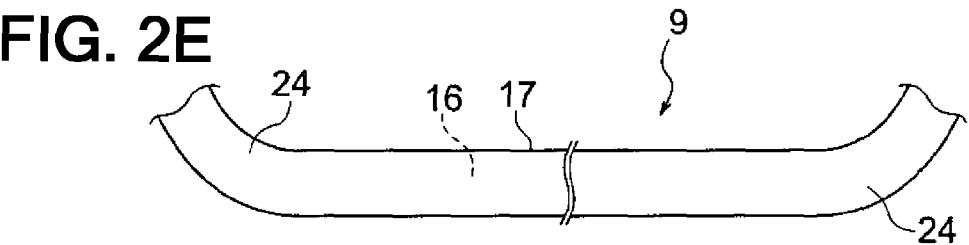

In FIG. 2E, a step of bending the metal pipe body 16 which is covered by the shrinkable tube 17 to a predetermined position to be formed into a three-dimensional shape is performed. The bending is performed using a well-known pipe vendor. Reference numbers 24 show bended parts. Even if the shrinkable tube 17 is formed with the bended parts 24, damages such as cut or the like (problems equivalent to the stripping in the case of coating) will not occur.

The steps by far are equivalent to a third step of bending the metal pipe body 16 to a predetermined position to be formed into a three-dimensional shape.

As described with reference to FIGS. 1A, 1B and 2A to 2E, according to the wire harness 9 of the present invention, the outer surface of the metal pipe body 16 is covered by the shrinkable tube 17 to make the wire harness 9 recognized as a high voltage one. An effect is achieved which is that it is easier to manage the thickness by using the shrinkable tube 17 to cover the metal pipe body 16 than, for example, by coating.

The dimension precision of the thickness of the shrinkable tube 17 is higher than that of the coating. Therefore, an effect is achieved which is that the shape design of the clamp which is used to fix the metal pipe body 16 can be very easy, and an effect is achieved which is that if a component is to be assembled above the metal pipe body 16, it can be very easy to set the allowance.

Furthermore, since it is not necessary to manage the coating film as in the case of coating, an effect is achieved which is that the general management can be very easy.

In addition, since the shrinkable tube 17 is used, an effect is achieved which is that the processing steps and devices can be simplified in comparison with, for example, the coating.

Since the shrinkable tube 17 is used, an effect is achieved which is that even if the bended parts 24 are formed, problems equivalent to coating stripping can be prevented.

Furthermore, since the shrinkable tube 17 is used, effects are achieved which are that the coherency to the metal pipe body 16 is improved, there will be no coating dimples or coating spots in the case of coating, and the appearance can be well ensured.

Furthermore, since the shrinkable tube 17 is used to cover from the outer surface 21 of the pipe body 16 to the inner surface 22 of the pipe body 16, an effect is achieved which is that a beforehand edge process at the metal pipe body 16 side may be not necessary. Furthermore, an effect is achieved which is that separate components which are used in the edge process of the metal pipe body 16 are not necessary.

To summarize the effects described above, effects are achieved which are that to make the wire harness recognized as a high voltage one, the processing steps can be simplified, the cost can be reduced, and the quality can be improved.

Although not particularly limited, in the embodiment 1, the metal pipe body 16 does not function as a shielding member as that in a traditional example. Therefore, the metal pipe body 16 has a very simple structure. Since the metal pipe body 16 which has such a simple structure is used, and is covered by the shrinkable tube 17, naturally, the state after the metal pipe body 16 is covered by the shrinkable tube 17 is stable.

Regardless of the above description, naturally, the metal pipe body 16 may function as a shielding member.

Embodiment 2

Figure 3A:
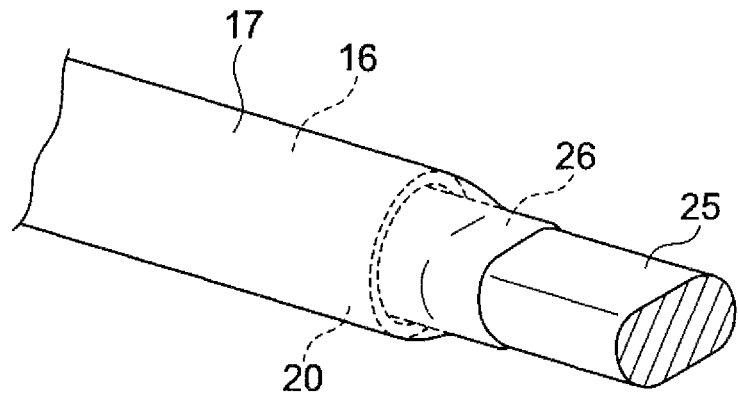
FIGS. 3A and 3B are figures related to other examples of the automobile high voltage wire harness (embodiments 2 and 3).

Next, an embodiment 2 is described with reference to the figures. FIG. 3A is a figure according to another example of the automobile high voltage wire harness. Furthermore, the components that are identical with those in the above-mentioned embodiment 1 are given identical numbers, and their detailed description is omitted.

In FIG. 3A, a cabtire cable 25 which serves as the high voltage electrical pathway is drawn out from the end portion 20 of the metal pipe body 16 covered by the shrinkable tube 17. Besides the metal pipe body 16, the shrinkable tube 17 covers a pipe body drawn out part 26 of the cabtire cable 25, that is, a sheath which is positioned on the outer periphery of the cabtire cable 25.

In the embodiment 2, since the pipe body drawn out part 26 is included and covered by the shrinkable tube 17, the metal pipe body 16 and the cabtire cable 25 are fixed by the shrinkable tube 17. Therefore, other than the effects of the embodiment 1 described above, an effect is achieved which is that the process to fix the pipe body drawn out part 26 to the metal pipe body 16 which is the exterior member, for example, to fix by a tape, the sealing process, the water-proofing process or the like is not necessary.

Embodiment 3

Figure 3B:
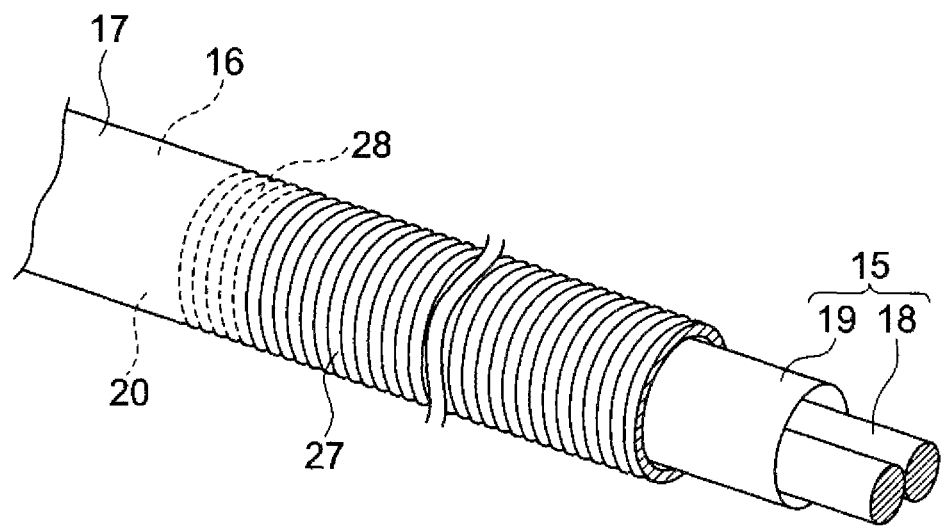

Next, an embodiment 3 is described with reference to the figures. FIG. 3B is a figure according to another example of the automobile high voltage wire harness. Furthermore, the components that are identical with those in the above-mentioned embodiments 1 and 2 are given identical numbers, and their detailed description is omitted.

In FIG. 3B, a corrugated tube 27 is connected to the end portion 20 of the metal pipe body 16 which is covered by the shrinkable tube 17. The electrical pathway aggregate 15 is drawn out from the corrugated tube 27. The electrical pathway aggregate 15 may be the cabtire cable 25 described in the embodiment 2. Besides the metal pipe body 16, the shrinkable tube 17 covers a pipe body connecting part 28 of the corrugated tube 27, that is, a terminal part which is positioned at the metal pipe body 16 side of the corrugated tube 27.

The corrugated tube 27 is included to form a bendable part.

In the embodiment 3, since the pipe body connecting part 28 of the corrugated tube 27 is included and covered by the shrinkable tube 17, the metal pipe body 16 and the corrugated tube 27 are fixed by the shrinkable tube 17. Therefore, other than the effects of the embodiment 1 described above, an effect is achieved which is that a tape or fixing member to connect the metal pipe body 16 and the corrugated tube 27 can be not necessary.

It is apparent that various modifications can be made to the invention without changing the purpose of the invention.

The features of the automobile high voltage wire harness and the method of manufacturing the automobile high voltage wire harness according to the embodiments of the present invention described above are briefly, collectively listed in the following i to v, respectively.

[i] A wire harness (9) including:
one or a plurality of high voltage electrical pathway (15) that is wired in an automobile;
a metal pipe body (16) that is an exterior member of the high voltage electrical pathway (15), and
a shrinkable tube (17) that covers part of or all of an outer surface of the metal pipe body (16) and has a color to make the wire harness recognized as a high voltage one.

[ii]. In the wire harness (9) of [i], the shrinkable tube (17) is returned to cover an outer surface at an end portion of the metal pipe body, an end surface of the metal pipe body, and an inner surface at the end portion of the metal pipe body.

[iii]. In the wire harness (9) of [ii], the shrinkable tube (17) covers an end portion of the metal pipe body (16) and a pipe body drawn out part of the high voltage electrical pathway (15) which is drawn out from the end portion of the metal pipe body.

[iv]. The wire harness of [1] further including a corrugated tube (27) that is connected to the end portion of the metal pipe body (16),
wherein the shrinkable tube (17) covers the end portion and a pipe body connecting part (28) of the corrugated tube (27) which is connected to the end portion.

[v]. A method of manufacturing a wire harness (9) comprising:
a first step of setting a shrinkable tube (17) which has a color to make the wire harness recognized as a high voltage one outside a metal pipe body (16) which is an exterior member of one or a plurality of high voltage electrical pathway (15) wired in an automobile,
a second step of making the shrinkable tube (17) shrink to cover part of or all of the outer surface of the metal pipe body (16), and
a third step of bending the metal pipe body (16) to a predetermined position to be formed into a three-dimensional shape.

Although the invention is described in detail with reference to specific embodiments, it is apparent that various modifications and amendments may be made by those skilled in the art without departing from the spirit and scope of the invention.

This application is based on the Japanese patent application (patent application No. 2011-159515) filed on Jul. 21, 2011, whose content is incorporated herein by reference.

INDUSTRIAL APPLICABILITY

According to the present invention, an effect is achieved which is that the processing steps to make the wire harness recognized as a high voltage one can be simplified, and the present invention is useful in the fields related to an automobile high voltage wire harness and a method of manufacturing the automobile high voltage wire harness.

REFERENCE NUMERALS LIST

1 . . . hybrid automobile (automobile)
2 . . . engine
3 . . . motor unit
4 . . . inverter unit
5 . . . battery
6 . . . engine room
7 . . . automobile back part
8 . . . high voltage wire harness
9 . . . wire harness (automobile high voltage wire harness)
10 . . . middle part
11 . . . automobile body floor 12 . . . junction block
13 . . . back end
14 . . . front end
15 . . . electrical pathway aggregate
16 . . . metal pipe body
17 . . . shrinkable tube
18 . . . high voltage electric wire (high voltage electrical pathway)
19 . . . electromagnetic shielding member (shielding member)
20 . . . end portion
21 . . . outer surface at end portion
22 . . . inner surface at end portion
23 . . . end portion
24 . . . bended part
25 . . . cabtire cable (high voltage electrical pathway)
26 . . . pipe body drawn out part
27 . . . corrugated tube
28 . . . pipe body connecting part

The invention claimed is:

1. A method of manufacturing an automobile high voltage wire harness comprising:
    setting a shrinkable tube which has a color to make the wire harness recognized as a high voltage one outside a metal pipe body which is an exterior member of one or a plurality of high voltage electrical pathway(s) wired in an automobile;
    making the shrinkable tube shrink to cover part of or all of the outer surface of the metal pipe body; and
    bending the metal pipe body to a predetermined position to be formed into a three-dimensional shape.

2. A method of manufacturing an automobile high voltage wire harness comprising:
    inserting a metal pipe body, which is an exterior member of one or a plurality of high voltage electrical pathway(s) wired in an automobile, into a shrinkable tube;
    setting the metal pipe body and the shrinkable tube at a predetermined position, wherein the shrinkable tube covers part of or all of an outer surface of the metal pipe body, and at least one end portion of the shrinkable tube is longer than a respective at least one end portion of the metal pipe body by a predetermined length;
    inserting the predetermined length of the at least one end portion of the shrinkable tube into a respective inside of the at least one end portion of the metal pipe body such that a surface of the at least one end portion of the metal pipe body is covered by the at least one shrinkable tube end portion; and
    bending the metal pipe body to a predetermined position to be formed into a three-dimensional shape,
    wherein the shrinkable tube has a color to make the wire harness recognized as a high voltage one outside the metal pipe body.

3. The method of manufacturing the automobile high voltage wire harness according to claim 2, further comprising:
    folding back ends of the shrinkable tube in order to insert the at least one end portion of the shrinkable tube into the inside of the metal pipe body.

* * * * *